United States Patent [19]

Kim

[11] Patent Number: 5,528,736
[45] Date of Patent: Jun. 18, 1996

[54] APPARATUS AND METHOD FOR PERFORMING A TWO-DIMENSIONAL BLOCK DATA TRANSFORM WITHOUT TRANSPOSITION

[75] Inventor: Seung P. Kim, New York, N.Y.

[73] Assignee: Polytechnic University, Brooklyn, N.Y.

[21] Appl. No.: 875,625

[22] Filed: Apr. 28, 1992

[51] Int. Cl.[6] .................................................. G06F 15/00
[52] U.S. Cl. ............................................................. 395/138
[58] Field of Search .................................... 395/133, 138, 395/136, 137, 139; 345/126, 127; 364/729, 733

[56] References Cited

U.S. PATENT DOCUMENTS 4,489,390  12/1984  Parenti et al. ........................... 364/724
4,791,598  12/1988  Lion et al. ............................... 364/725

FOREIGN PATENT DOCUMENTS 59-151262  8/1984  Japan .

*Primary Examiner*—Phu K. Nguyen
*Attorney, Agent, or Firm*—Curtis, Morris & Safford

[57] ABSTRACT

A circuit for performing a two-dimensional transform on an N×M block of input data elements includes a row transform section that sequentially receives N rows of input data and performs a one-dimensional transform on each row as it is received. The row transform section provides row transform data row-by-row to a column transform section. The column transform section performs parallel, column-wise one-dimensional transform calculations on each row of transform data as it is received. The column transform section completes the column transform calculations upon receipt of the last row of row transform data to provide an N×M block of 2-D transform data. The input data are received serially element-by-element and the 2-D transform data are output serially element-by-element. A third 1-D transform section may be added to form a circuit for performing a three-dimensional transform on an N×M×L block of input data elements.

38 Claims, 11 Drawing Sheets

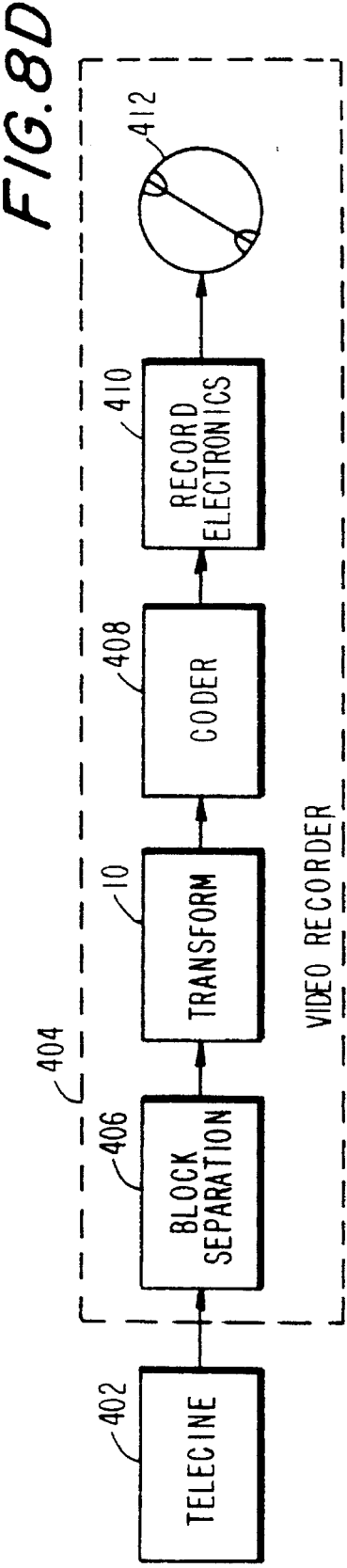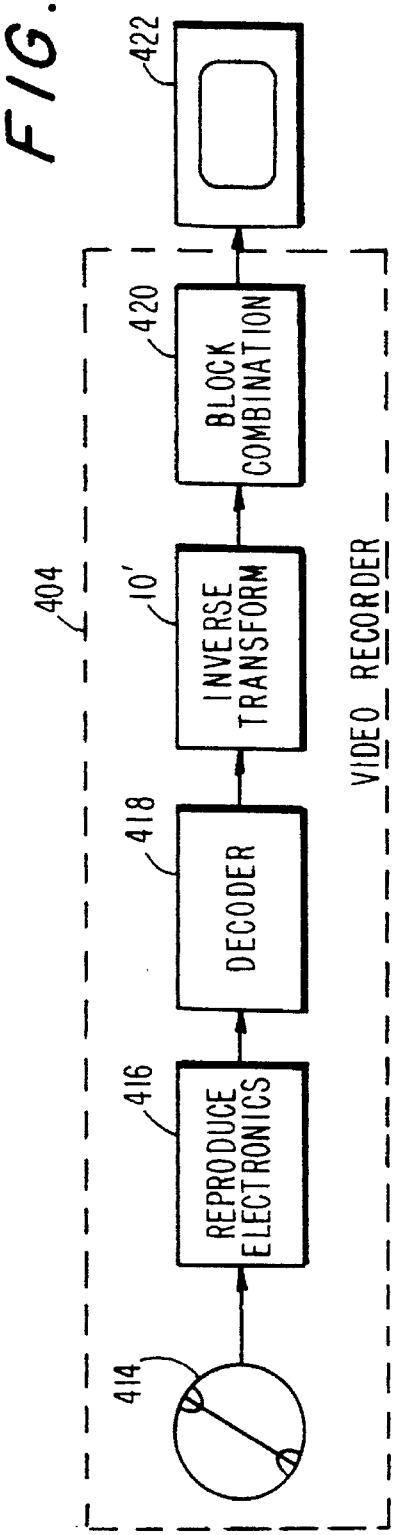

APPARATUS AND METHOD FOR PERFORMING A TWO-DIMENSIONAL BLOCK DATA TRANSFORM WITHOUT TRANSPOSITION

This invention relates to devices and methods for performing two-dimensional block data transforms, and more particularly to such devices and methods in which input data blocks are received serially word-by-word and transform data blocks are output serially word-by-word.

Two-dimensional block data transform circuits are widely used in signal processing applications. A particularly important application for such circuitry is image and video signal compression coding which is used to reduce the amount of data to be transmitted or stored and thus increase the speed and reduce the cost of such operations.

In such applications, blocks of picture element data arrayed by row and column are subjected to a two-dimensional transform such as a 2-D discrete cosine transform (DCT). Transform data resulting from the DCT are then coded and, for example, transmitted or stored on a recording medium such as magnetic tape. The data making up each block are customarily multi-bit words, such as 8-bit words, and the words are usually received serially by the transform device and the transform data is usually output serially, i.e., data word by data word.

As shown schematically in FIG. 1, a typical 2-D transform circuit according to the prior art includes a row transform section 50, a transposition section 52 and a column transform section 54. Row transform section 50 performs one dimensional transforms on the rows of the input data block, thereby producing an intermediate transform data matrix. The intermediate matrix is then output to the transposition section 52 which performs a transposition in which rows of the matrix are made into columns and columns into rows. The transposed matrix is then transmitted to column transform section 54 which performs 1-D transforms on the rows of the transposed matrix, which were formerly columns of the intermediate matrix. Section 54 thus produces a 2-D transform data matrix which is then output, data word by data word, for further coding, transmission, etc. A 2-D transform circuit of this general type is disclosed, for example, in U.S. Pat. No. 4,791,598 to Liou et al. As is well known to those skilled in the art, each of the 1-D row or column transforms entails matrix multiplication of the row or column by an appropriate coefficient matrix.

A disadvantage of known 2-D transform circuitry lies in the use of a transposition circuit, which is normally a buffer memory or a complicated circuit, either of which adds significantly to the cost and complexity of the transform circuitry. A further disadvantage is found in the length of time required to perform the 2-D transform on each block of data. For an N×N data block, there are usually required $N^2$ clock cycles for inputting and performing the 1-D row transforms on the data words, another $N^2$ clock cycles for performing the 1-D column transforms, plus whatever time is required for the operation of the transposition section. Thus, more than $2N^2$ clock cycles are usually required to perform the 2-D transform on each N×N block. Although prior art systems have achieved throughput rates of one block per $N^2$ clock cycles, the cost in hardware is significant and the elapsed calculating time for each block of $2N^2$ clock cycles or more can cause synchronization problems such as jitter in a video image.

Accordingly, it is an object of the present invention to provide a 2-D block data transform device and method which eliminate or alleviate the foregoing problems; specifically, it is an object to provide a device and method for performing a 2-D block data transform which is simpler and less expensive than prior devices and methods.

It is a further object of the invention to provide a device and method for performing such a transform faster (i.e., in fewer clock cycles) than in prior devices and methods.

In accordance with the present invention, the foregoing objects are met by the provision of a device for performing a two-dimensional transform on a block of input data elements arrayed in N rows and M columns. The device includes a row transform section for receiving and sequentially performing a one-dimensional transform on the N rows of the input data to generate N rows of row transform data, and a column transform section for receiving the N rows of row transform data row-by-row from the row transform section, performing parallel, column-wise one-dimensional transform calculations on the rows of row transform data as the same are received, and after receiving the Nth row of the row transform data, completing the calculations to provide an N×M transform data matrix. In a preferred embodiment of the present invention, the input data block consists of eight rows and eight columns.

According to certain aspects of the invention, the row transform section receives input data element-by-element (i.e., word-by-word), and shifts out row transform data word-by-word to the column transform section. The column transform section in turn shifts out data elements of the transform data matrix word-by-word, thereby providing word-by-word (i.e. word serial) output of the 2-D transform data.

In a preferred embodiment of the invention, each of the transform sections includes eight ROMs, each of which holds eight transform coefficients. Each of the sections also includes eight multiplication-accumulator modules which serve to perform parallel multiplication of coefficients from a respective ROM with either input data or row transform data, as the case may be.

According to another aspect of the invention, each of the multiplication-accumulator modules includes input terminals for receiving two numbers that are to be multiplied together, a shift input terminal for receiving transform data shifted from a prior stage module and an output terminal for shifting out transform data to a latter stage module, a multiplier that receives the two numbers from the input terminal, multiplies the same to form a product and outputs the product, a first data register for storing the accumulation data, an adder connected to the multiplier and the first data register for adding the product outputted by the multiplier to the accumulation data stored in the register and storing the resulting sum as accumulation data in the register, a second data register connected to the shift output terminal for storing and shifting out transform data and a multiplexer connected to the adder, the second data register and the shift input terminal for selectively storing in the second register either transform data received at the shift input terminal or the sum supplied by the adder.

In a preferred embodiment of the invention, the multiplication-accumulator modules of the column transform section have first and second data registers which each include eight shift data storage locations.

According to another aspect of the invention, a device is provided for performing a three-dimensional transform on a 3-D input data block.

It is not intended that the invention be summarized here in its entirety. Rather, further features, aspects and advantages of the invention will be set forth in or apparent from the following description and drawings. In the drawings:

FIGS. 8A–8F illustrate applications in which the 2-D transform device of FIG. 7 may be used.

GENERAL DESCRIPTION

Figure 1:
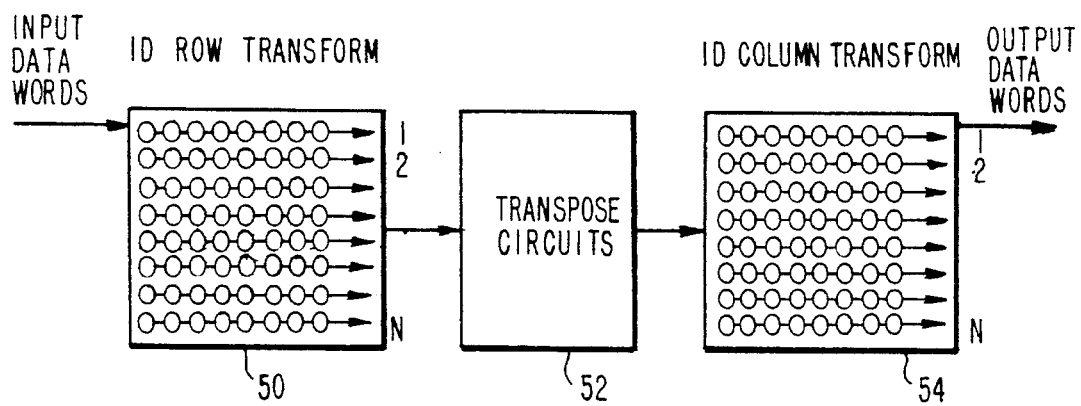
FIG. 1 is a schematic illustration of a 2-D transform device according to the prior art.
Figure 2:
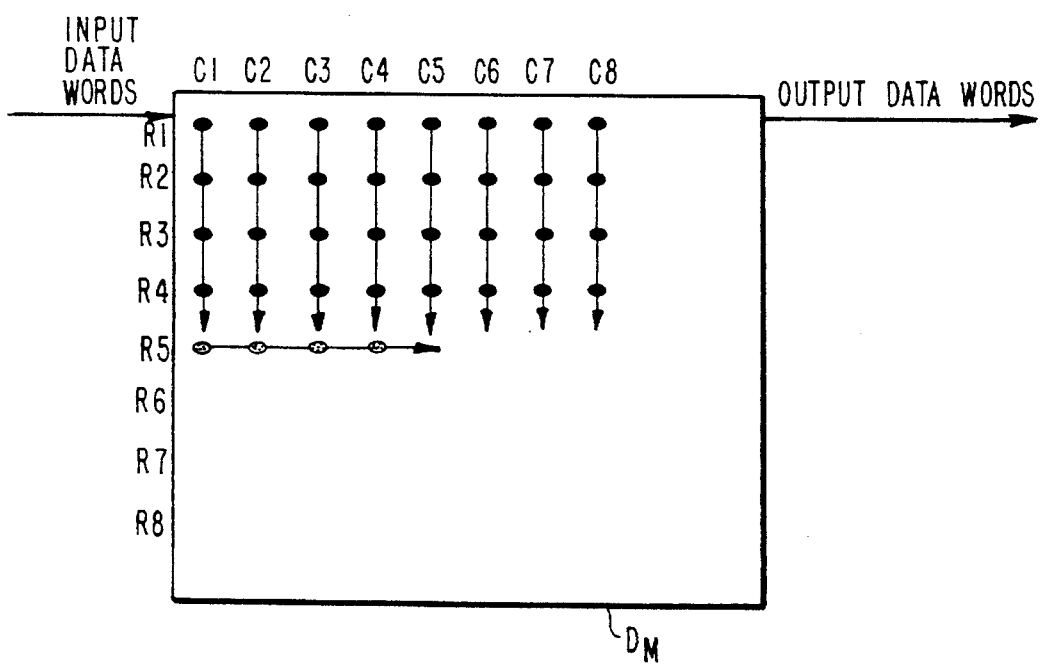
FIG. 2 is a schematic illustration of a 2-D block data transform performed by using the device and method of the present invention.

FIG. 2 illustrates, in general terms, the performance of a two-dimensional transform in accordance with the present invention.

Data matrix $D_M$ is an 8×8 matrix having rows R1–R8 and columns C1–C8. The black dots making up rows R1–R4 indicate that the input data elements (i.e., words) corresponding to those rows have been received and one-dimensional transforms have been performed for those rows. The four circles of row R5 indicate that the four corresponding data elements have been received and that the one-dimensional transform for row R5 is in progress.

Meanwhile, the downward pointing arrows in columns C1–C8 indicate that the row transform data from rows R1–R4 are being used to begin one-dimensional column-wise transforms in the respective columns C1–C8. In other words, column-wise one-dimensional data transforms, using row transform data from completed row transforms, are being performed in parallel with one-dimensional row transforms.

2-D TRANSFORM CIRCUIT

Figure 3:
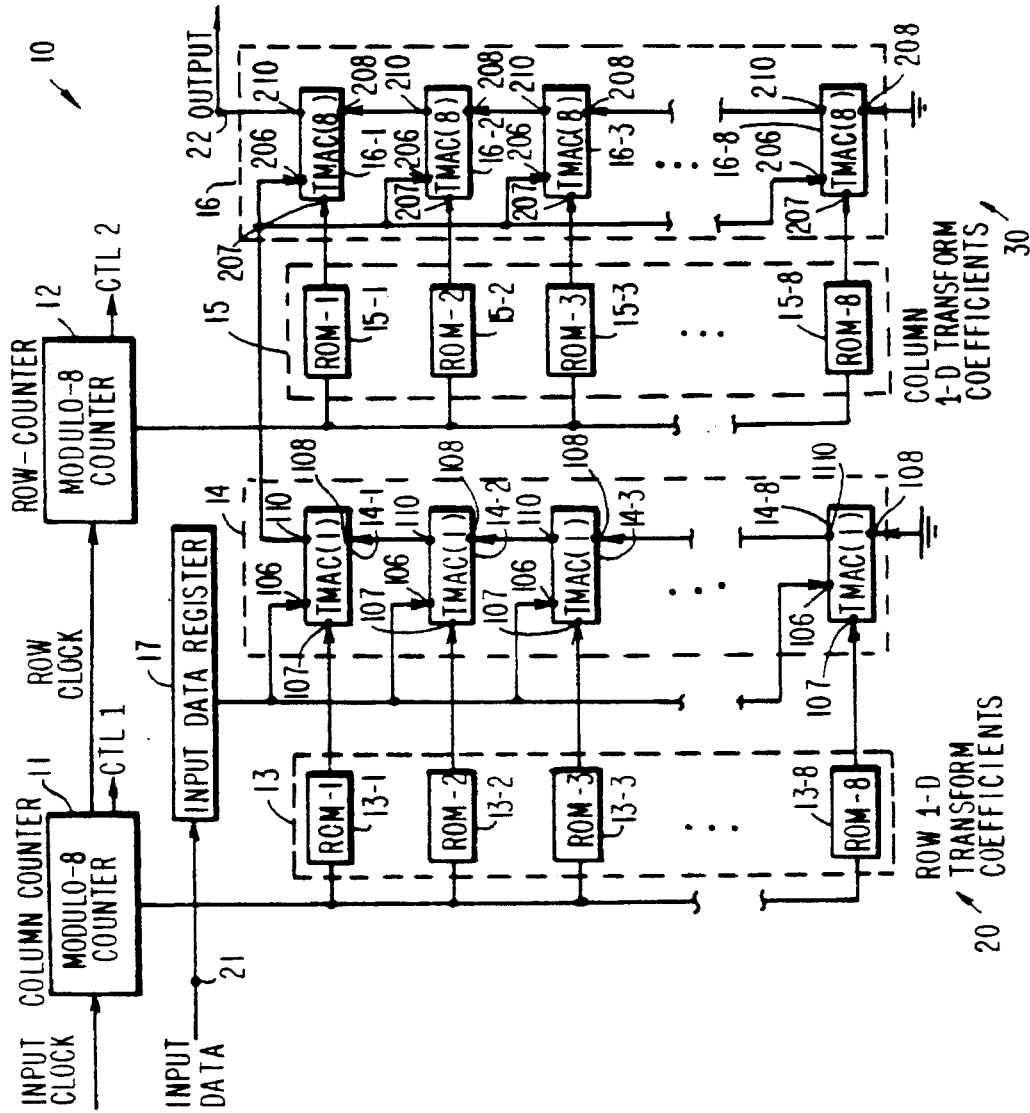
FIG. 3 is a block diagram of a device in accordance with the present invention for performing a 2-D transform on an 8×8 input data block.

Referring now to FIG. 3, reference numeral 10 generally indicates a circuit which performs a two-dimensional transform in accordance with the invention on an 8×8 block of input data. Circuit 10 includes row transform section 20 and column transform section 30. Row transform section 20 includes eight ROMs 13, each of which stores eight transform coefficients $c_{ij}$. Accordingly, ROMs 13 collectively store an 8×8 transform coefficient matrix C. Section 20 also includes eight time-multiplexed multiplication-accumulation modules (TMAC) 14. As will be seen, each TMAC 14 has two data registers, each of which has one data storage location.

Each TMAC 14 is connected to a respective ROM 13 in order to receive a selected coefficient $c_{ij}$ from the ROM 13. Each TMAC 14 is also connected to input data register 17, which stores one or more of the data words which are supplied to it word-by-word via input terminal 21. As explained in more detail below, the notation "TMAC(1)" on FIG. 3 indicates that the multiplication-accumulator module has registers that store one data element.

As will be described in more detail below, each TMAC 14 multiplies input data words by coefficients provided by its respective ROM 13 and accumulates results of the multiplications in order to generate row transform data.

At first modulo-8 counter 11 is connected to the address input of each of the ROMs 13. Counter 11 selects the coefficient $c_{ij}$ to be supplied by each ROM 13 to its respective TMAC 14. The selection is accomplished by addressing an appropriate memory location of each ROM 13.

Column transform section 30 includes eight ROMs 15 each of which stores eight transform coefficients $d_{ij}$. Accordingly, ROMs 15 collectively store an 8×8 transform coefficient matrix D. Section 30 also includes eight time-multiplexed multiplication-accumulation modules (TMAC) 16. As will be seen, each TMAC 16 has two data registers, each of which has eight data storage locations.

Each TMAC 16 is connected to a respective ROM 15 in order to receive a selected coefficient $d_{ij}$ from the ROM 15. Each TMAC 16 is also connected to TMAC 14-1, which, as will be explained, supplies row transform data words, word-by-word, to the TMAC's 16. As explained in more detail below, the notation "TMAC(8)" on FIG. 3 indicates that the multiplication-accumulator module has registers that store eight data elements.

As will be described in more detail below, each TMAC 16 multiplies row transform data words by coefficients provided by its respective ROM 15 and accumulates results of the multiplications in order to generate 2-D transform data. TMAC 16-1 is coupled to an output terminal 22 so as to shift out 2-D transform data word-by-word.

A second modulo-8 counter 12 is connected to each of the ROMs 15. Counter 12 selects the coefficient $d_{ij}$ to be supplied by each ROM 15 to its respective TMAC 16. The selection is accomplished by addressing an appropriate memory location of each ROM 15. Counter 12 is also connected to receive counter 11 so as to receive clock pulses from counter 11.

MULTIPLICATION-ACCUMULATOR MODULES

Figure 4:
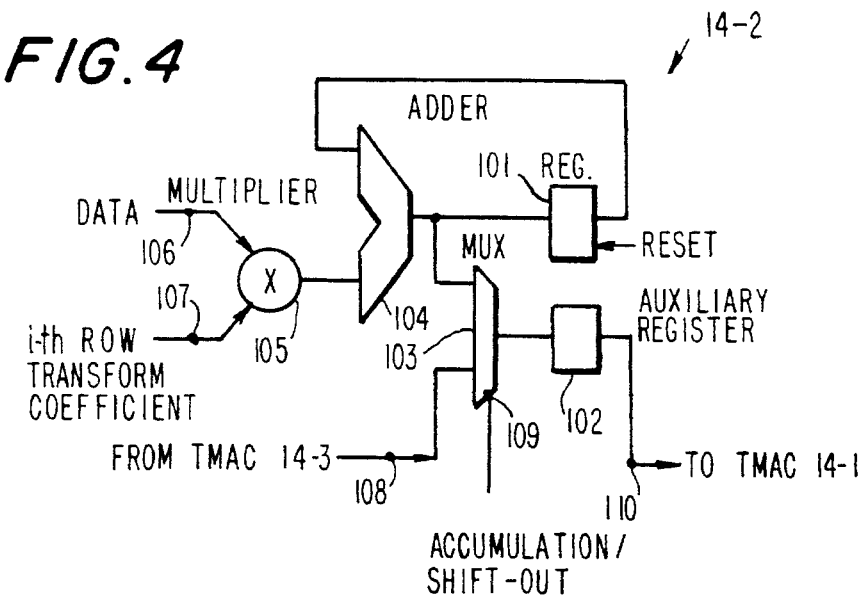
FIG. 4 is a block diagram of a time-multiplexed multiplication-accumulator module used in the device of FIG. 3.

FIG. 4 shows a block diagram of TMAC 14-2, which has the same structure as TMACs 14-1, and 14-3 through 14-8 (FIG. 3). TMAC 14-2 includes a multiplier 105 which has input terminals 106 and 107. TMAC 14-2, like the other TMACs 14, has its input terminal 106 coupled to input data register 17 (FIG. 3) to receive successive input data words. Input terminal 107 of TMAC 14-2 is coupled to ROM 13-2 to receive successive coefficients. (As shown in FIG. 3, TMAC 14-1 has its input terminal 107 coupled to ROM 13-1, TMAC 14-3 has its input terminal 107 coupled to ROM 13-3, and so forth through TMAC 14-8 which has its input terminal 107 coupled to ROM 13-8.)

Referring again to FIG. 4, the output of multiplier 105 is connected to an input of an adder 104. Multiplier 105 multiplies the data word and the coefficient and provides to adder 104 a product that results from the multiplication. Adder 104 has another input that is connected to the output of a register 101 and receives data stored in 101. Adder 104 adds the product received from multiplier 105 to the data received from register 101 and supplies the sum resulting from that addition back to register 101. It will therefore be recognized that register 101 stores data that is an accumulation of successive products supplied by multiplier 105.

A multiplexer 103 is provided. It has one input connected to the output of adder 104, and another input connected to input terminal 108. The output of multiplexer 103 is connected to a register 102. Under the control of a control signal applied to its control terminal 109, multiplexer 103 selectively provides for storage in auxiliary register 102 of either the sum received from adder 104 or a data word received via terminal 108. Auxiliary register 102 is adapted to shift out data stored therein via an output terminal 110.

As shown in FIG. 3, TMAC 14-2 has its output terminal 110 connected to the input terminal 108 of TMAC 14-1 and its input terminal 108 connected to output terminal 110 of TMAC 14-3. Input terminal 108 of TMAC 14-3 is connected to output terminal 110 of TMAC 14-4 (not explicitly shown), input terminal 108 of TMAC 14-4 is connected to output terminal 110 of TMAC 14-5 (not explicitly shown) and so forth, with input terminal 108 of TMAC 14-7 (not explicitly shown) connected to output terminal 110 of 14-8. Thus the eight registers 102 of TMAC's 14 are chained together to form an eight position shift register when the respective multiplexers 103 are controlled to provide data from one register 102 to the next. Output terminal 110 of TMAC 14-1 is connected to each of the TMAC 16, as will be described below, and input terminal 108 of TMAC 14-8 is grounded.

Figure 5:
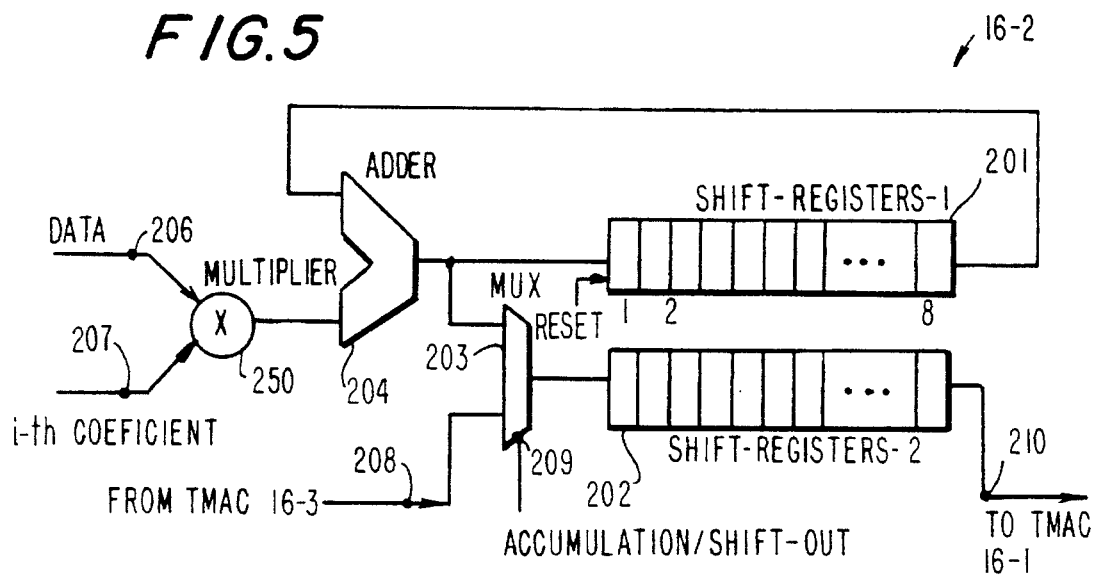
FIG. 5 is a block diagram of another time-multiplexed multiplication accumulator module used in the device of FIG. 3.

FIG. 5 shows a block diagram of a TMAC 16-2 used in the device 10 shown in FIG. 3. TMAC 16-2 has the same structure as TMACs 16-1 and 16-3 through 16-8 (FIG. 3) and is similar to TMAC 14-2 (FIG. 4) except that each of the data registers of TMAC 16-2 contains eight data word storage locations.

Thus, TMAC 16-2 includes a multiplier 205 which has input terminals 206 and 207. TMAC 16-2, like the other TMAC's 16, has its input terminal 206 coupled to output terminal 110 of TMAC 14-1 (FIG. 3) to receive therefrom successive row transform data words. Input terminal 207 of TMAC 16-2 is coupled to ROM 15-2 to receive coefficients stored in ROM 15-2. As shown in FIG. 3, TMAC 16-1 has its input terminal 207 coupled to ROM 15-1, TMAC 16-3 has its input terminal 207 coupled to ROM 15-3, and so forth through TMAC 16-8 which has its input terminal 207 coupled to ROM 15-8.

Referring again to FIG. 5, the output of multiplier 205 is connected to an input of an adder 204. Multiplier 205 multiplies the data word and the coefficient received on terminals 206 and 207 respectively and provides to adder 204 a product that results from the multiplication. Adder 204 has another input that is connected to the output of shift register 201 and receives data stored in the eighth data storage location of register 201.

Adder 204 adds the product received from multiplier 205 to the data received from register 201 and supplies the sum resulting from that addition to the first data storage location of register 201. Each time adder 104 performs an addition and supplies the resulting sum to the first storage location, the data stored in each of the locations of register 201 are shifted one location to the right. It will therefore be recognized that each storage location of register 201 stores data that is an accumulation of every eighth product supplied by multiplier 205.

A multiplexer 203 is provided. It has one input connected to the output of adder 204 and another input connected to input terminal 208. The output of multiplexer 103 is connected to a register 202, which, like register 201, is a shift register having eight data word storage locations. Under the control of a control signal applied to its control terminal 109, multiplexer 103 selectively provides for storage in the first location of register 202 either the sum data word received from adder 104 or a data word received via terminal 108. The data words stored in the eight locations of register 202 are shifted to the right each time a data word is supplied to the first location, with the word stored in the eighth location being shifted out via output terminal 210.

As shown in FIG. 3, TMAC 16-2 has its output terminal 210 connected to the input terminal 208 of TMAC 16-1 and its input terminal 208 is connected to output terminal 210 of TMAC 16-3. Input terminal 208 of TMAC 16-3 is connected to output terminal 210 of TMAC 16-4 (not explicitly shown), input terminal 208 of TMAC 16-4 is connected to output terminal 210 of TMAC 16-5 (not explicitly shown), and so forth, with input terminal 208 of TMAC 16-7 (not explicitly shown), connected to output terminal 210 of TMAC 16-8. Thus the eight registers 202 of TMAC's 16 are chained together to form a 64 position shift register when the respective multiplexers 203 are controlled to provide data from one register 202 to the next. Output terminal 210 of TMAC 16-1 is connected to device 10's output terminal 22, and the input terminal 208 of TMAC 16-8 is grounded.

OPERATION OF 2-D TRANSFORM DEVICE

Referring again now to FIG. 3 and 4, in operation of device 10 input data words $a_{ij}$ are provided serially from input terminal 21 via input data register 17 to each input terminal 106 of the TMACs 14. Each data word $a_{ij}$ is provided simultaneously to all of the TMACs 14. At the same time, the appropriate coefficient $c_{1j}$ is provided from ROM 13-1 to input terminal 107 of TMAC 14-1, coefficient $c_{2j}$ is supplied from ROM 13-2 to terminal 107 of TMAC 14-2 and so forth.

To consider a specific example, start with the first element, $a_{11}$, of a data block. Element $a_{11}$ is supplied simultaneously to the data input terminal 106 of each TMAC 14. Modulo-8 counter 11 is at the count of "0" and therefore asserts an appropriate address of ROM 13-1 so that coefficient $C_{11}$ is provided at coefficient input terminal 107 of TMAC 14-1, while simultaneously ROM 13-2 provides coefficient $c_{21}$ to input terminal 107 of TMAC 14-2, and so forth for each of the remaining pairs of ROMs 13 and TMACs 14.

When the next input data element, $a_{12}$, is provided at the respective input terminals 106 of the TMACs 14, counter 11 has incremented its count to "1" so that ROM 13-1 provides coefficient $c_{12}$ to TMAC 14-1, ROM 13-2 provides coefficient $C_{22}$ to TMAC 14-2 and so on through to ROM 13-8 which provides coefficient $c_{82}$ to TMAC 14-8.

For each of the first seven data elements $a_{1j}$ of the first row of the data block, the data element $a_{1j}$ is multiplied in the TMACs 14 (FIG. 3) by the respective coefficient $c_{ij}$ and the successive multiplications by each TMAC 14 are accumulated in its respective register 101 (FIG. 4). However, when the eighth input data element, $a_{18}$ is provided for multiplication to the TMAC's 14, counter 11 has incremented its count to "7" and provides a control signal to the control terminal 109 (FIG. 4) of each multiplexer 103 so that the sums which result from addition by the respective adders 104 of the eighth multiplication ($a_{18} \times c_{i8}$) with the accumulation of the previous seven multiplications are stored in the auxiliary register 102 (FIG. 4). At that the same time, the control signal from counter 11 (FIG. 3) resets each of the registers 101 to "0". To simplify FIG. 3, the connections between counter 11 and the respective multiplexers 103 and registers 101 are not shown.

As will be appreciated by those skilled in the art, storage in each register 102 of a sum of a respective eighth multiplication and the accumulation of the previous seven multiplications results in storage in registers 102 of TMAC's 14 of row transform data for the first row of the input data block. Then, as the TMACs 14 receive the second row of input data elements ($a_{21}$ through $a_{28}$) and multiply them by coefficients as just described with respect to the first row, the multiplexers 103 operate to shift the row transform data elements for the first row through the chain of registers 102 to the TMAC's 16 of column transform section 30. That is, the control signal to store a sum from respective adders 104 in registers 102 is applied only when the eighth input data element of a row is supplied. At other times the registers 102 are chained together by multiplexers 103 to act as an eight position shift register.

Turning now to operation of column transform section 30, row transform data words $a'_{ij}$ are received serially from register 102 of TMAC 14-1. Each row transform data word $a'_{ij}$ is provided simultaneously to all of the TMACs 16. At the same time, the appropriate coefficient $d_{1j}$ is provided from ROM 15-1 to input terminal 207 of TMACs 16-1, coefficient $d_{2j}$ is supplied from ROM 13-2 to terminal 207 of TMAC 16-2 and so forth.

Continuing with the example used with respect to row transform section 20, a first row transform element $a'_{11}$ is supplied to the data input terminal 106 of each TMAC 16 at the same time that input data element $a_{21}$ (the first element of the second row of the input data block) is provided to the TMACs 14. Modulo-8 counter 12 is at the count of "0" and therefore asserts an appropriate address of ROM 15-1 so that coefficient $d_{11}$ is provided at coefficient input terminal 207 of TMAC 16-1, while simultaneously ROM 15-2 provides coefficient $d_{21}$ to input terminal 207 of TMAC 16-2 and so forth for each of the remaining pairs of ROMs 15 and TMACs 16.

When the next row transform data element, $a'_{12}$, is provided at the respective input terminals 206 of TMAC 16, counter 12 has not incremented its count. As will be seen, counter 11 provides clock pulses to increment counter 12 only after the last row transform data element of a row has been provided. Accordingly, counter 12's count remains at "0" so that ROM 15-1 provides the same coefficient $d_{11}$ to TMAC 16-1, ROM 15-2 provides the same coefficient $d_{22}$ to TMAC 16-2 and so on to 15-8 which again provides the same coefficient $d_{81}$ to TMAC 16-8. Furthermore, the same set of coefficients $d_{i1}$ are provided to their respective TMACs 16 for successive multiplication by each of the elements of the first row of row transform data, and each of the first eight products of each TMAC 16 is stored in a respective storage location of its register 201 (FIG. 5). For example, after all eight of the row transform data elements of the first row have been supplied and multiplied, TMAC 16-1 stores the result of multiplying row transform data element $a'_{11}$ times coefficient $d_{11}$ in the eighth storage location of its shift register 201. The result of multiplying row transform data element $a_{12}$ by coefficient $d_{11}$ is stored in the seventh storage location of register 201. The product obtained by multiplying the next row transform data element by that same coefficient is stored in the next location to the left, and so forth to the first location of register 201, which stores the product of the same coefficient ($d_{11}$) and the eighth row transform data element of that row, namely $a'_{18}$.

As the first row transform data element of the second row, namely $a'_{21}$, is supplied to column transform section 30 (FIG. 3), counter 11 "counts over" from "7" to "0" and provides a clock pulse to counter 12, which increments counter 12 to a count of "1". Accordingly, the second coefficient, $d_{i2}$, is provided by each respective ROM 15 to its respective TMAC 16. Each respective TMAC then successively multiplies the same coefficient by each of the row transform data elements of the second row as the same are provided from row transform section 20.

Moreover, as the first row transform data element of the second row is multiplied by a TMAC 16 with the respective coefficient $d_{i2}$, the product resulting from that multiplication is added by adder 204 (FIG. 5) to the product of $a'_{11}$ and coefficient $d_{i1}$, which latter product had been stored in the eighth location of shift register 201. Similarly, the product of the next row transform data element $a'_{22}$ and coefficient $d_{i2}$ will be accumulated with the product of $a'_{12}$ and $d_{i1}$. The process will then continue through all of the second row and on through the third through seventh rows. In this way, column transform section 30 performs, in parallel, eight column-wise 1-D transforms on the row transform data as it is received row by row (and element by element) from row transform section 20.

When the first row transform data element of the eighth row of transformed data (namely $a'_{81}$) is provided counter 12 (FIG. 3) has incremented its count to "7" and provides a control signal to the control terminal 209 (FIG. 5) of each multiplexer 203 so that the sums provided by adder 204 are successively stored in the first location of shift register 202. It will be understood that counter 12 remains at "7" and continues to assert the control signal while all eight row transform data elements $a'_{8j}$ are received As the eight row transform data elements $a'_{81}$ through $a'_{88}$ are received multiplied by the respective coefficient $d_{i8}$ and added to the accumulated products resulting from the previous seven rows of row transform data, 2-D transform data are provided by adder 204 and transmitted via multiplexer 203 to fill up shift register 202. Upon receipt of the last row transform data element $a'_{88}$, and the following multiplication and addition by multipliers 205 and adders 204 respectively, the eight shift registers 202 hold all 64 elements making up an 8×8 block of 2-D transform data.

It should also be noted that the control signal from counter 12 is applied as a reset signal to the first storage location of shift register 201 (FIG. 5) during the receipt of the eight elements of the last row of row transform data. This occurs while the completed column transform data (i.e. 2-D transform data) are being stored in shift register 202 and allows shift register 201 to be completely reset in all of its eight positions so as to be prepared to accumulate the column-wise transform data for the next data block.

As before, in order to simplify FIG. 3 the connections between counter 12 and respective multiplexers 203 and registers 201 of the shown TMACs 16 are not shown.

As the first row transform data element of the next block is received at column transform section 30, counter 12 "counts over" from "7" to "0" so that the control signal is no longer applied to reset the first location of each register 201 and multiplexers 203 now operate to transmit data from respective input terminals 208 to the first storage location of respective registers 202. Thus, as mentioned before, the 64 storage locations collectively contained in registers 202 and now holding 64 elements of 2-D transform data are chained together to form a 64 position shift register. The 2-D transform data elements are then shifted out one by one, as the 64 row transform data elements of the next block are received and processed, as just described. It will be appreciated that when the eighth row of row transform data is being processed, with the respective shift registers 202 receiving the new 2-D transform data, the last eight elements of the previous block of 2-D transform data are being sequentially shifted out of register 202 of TMAC 16-1 via output terminal 22.

RELATIVE TIMING OF SUCCESSIVE BLOCKS

By reference to FIG. 6, the relative timing of the operations of the row transform section 20 and column transform section 30 will be explained.

Figure 6:
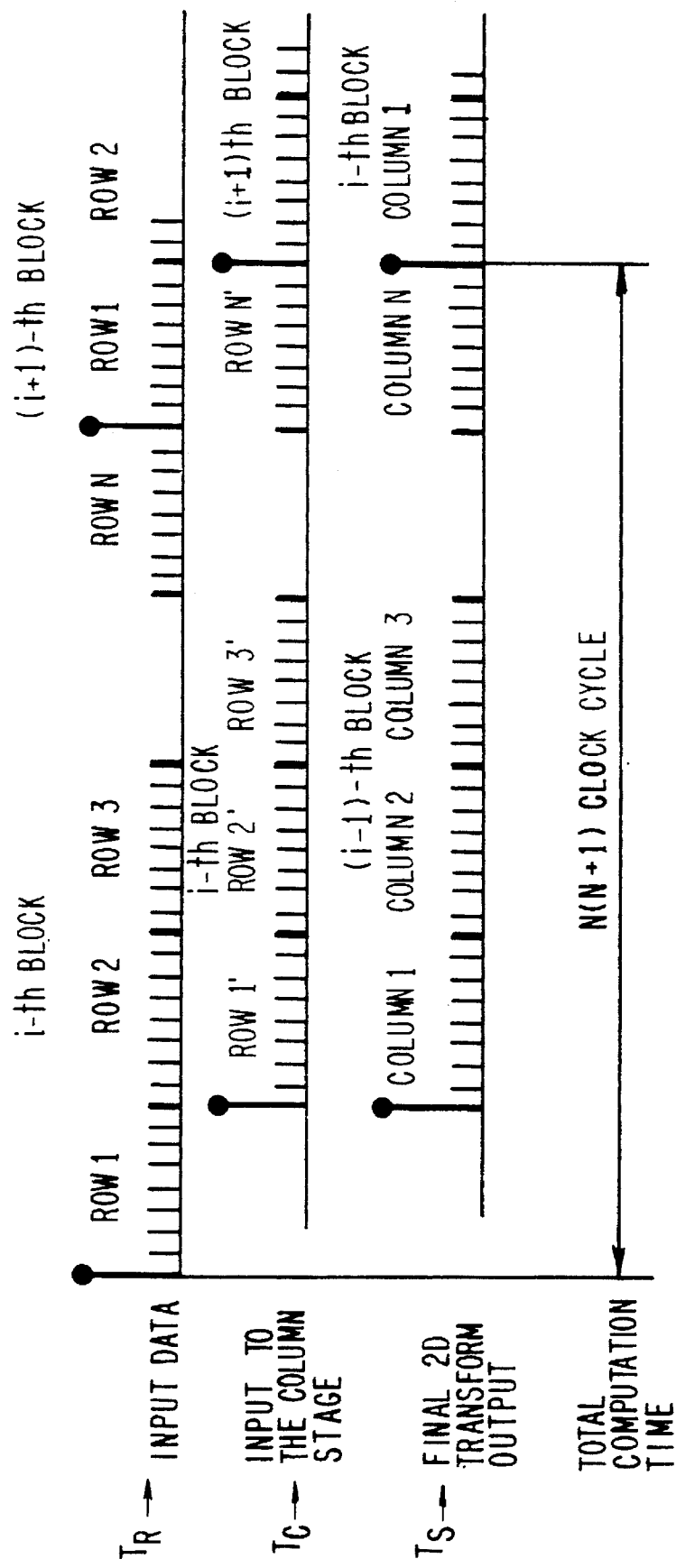
FIG. 6 is a schematic illustration of the timing of successive 2-D block data transforms using the device and method of the present invention.

FIG. 6 has the form of three horizontal time tracks, stacked in vertical relation to each other. The first time track $T_R$ shows the processing by row transform section 20 of input data elements. The second track $T_c$ illustrates the processing by column transform section 30 of row transform data elements received from row transform section 20. The third track $T_s$ illustrates shifting out of 2-D transform data elements by chained shift registers 202 of column transform section 30. The smallest division appearing on each of the three tracks represents the time required to process or shift out one data element. This time may be considered to be a clock cycle. It is assumed for the purposes of FIG. 6 that an N×N input data block is being processed.

It will be noted that the processing by column transform section 30 of the first row of row transform data overlaps completely with the processing by row transform section 20 of the second row of input data elements. This relation continues through the processing of the succeeding rows, until the processing of the last row of row transform data overlaps processing of the first row of input data of the next input data block.

It will also be noted that the shifting out of 2-D transform data of the previous block completely overlaps with column transform processing of the current block. Thus, the total computation time for the 2-D transform requires N(N+1) clock cycles and a given 2-D transform data element is shifted out N(N+1) clock cycles after its corresponding input data element was received.

However, since processing of each block is overlapped to the extent of N clock cycles with the processing of the next block, the throughput rate is one block every $N^2$ clock cycles which is the same as the rate at which input data elements are received. This high throughput rate is achieved without the expensive buffering circuitry and lengthy computation time of prior art circuits. Thus a relatively compact circuit design can be achieved. Also, device 10 avoids synchronization problems, such as image jitter, that result from the lengthy computation time of the prior art.

GENERALIZATION OF 2-D TRANSFORM DEVICE TO N×M CASE

Figure 7:
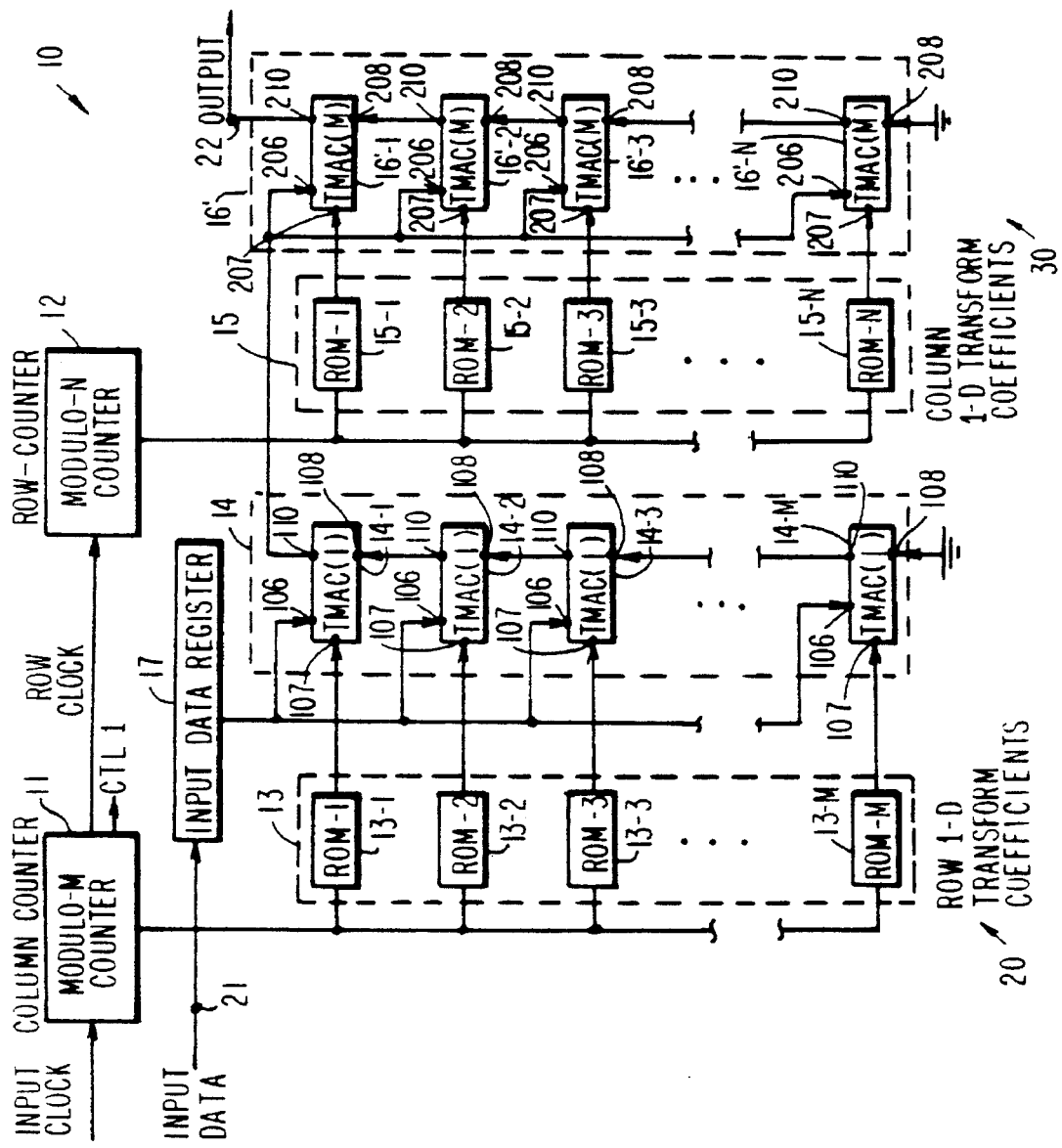
FIG. 7 is a block diagram of a device according to the present invention for performing a 2-D transform on a N row by M column input data block.

FIG. 7 shows a block diagram of a 2-D block data transform device, according to the present invention, for processing an input data block consisting of N rows and M columns. As such, the device illustrated in FIG. 7 is a more general case of the device shown in FIG. 3. However, operation of the device of FIG. 7 is analogous to that of the device of FIG. 3, so that only differences in structure will be pointed out. Moreover, components of the device of FIG. 7 will be assigned the same reference numerals as corresponding components of the device of FIG. 3.

Accordingly, column counter 11 is a modulo-M counter and row counter-12 is a modulo-N counter. ROMs 13 consist of M ROMs 13-1 to 13-M and TMACs 14 consists of M TMAC modules 14-1 through 14-M. ROMs 15 consist of N ROMs 15-1 through 15-N and TMACs 16' consist of N TMACs 16'-1 through 16'-N. Each of the TMACs 16' of FIG. 7 are like TMAC 16-2 of FIG. 5 except that the shift registers of the TMACs 16' (corresponding to shift registers 201 and 202 of FIG. 5) each have M data storage locations. (The notation "TMAC(M)" of FIG. 7 indicates that the multiplication-accumulator module has registers that store M data elements). As with the 8×8 2-D block data transform device of FIG. 3, the M parallel, column-wise 1-D transforms performed by column transform section 30 are overlapped in time with the N row-wise 1-D transforms sequentially performed by row transform section 20.

ADDITIONAL POINTS CONCERNING 2-D TRANSFORM DEVICE

Although 8-bit input data words are typical, it will be understood that 2-D transform devices according to the present invention may be arranged to process input data words containing more or fewer than eight bits. The number of bits contained in row transform data words is a function of the type of multipliers 105 and adders 104 that are used. Of course, the larger the number of bits, the greater the resolution provided. Similarly, multipliers 205 and adders 204 may be selected to produce the desired number of bits for each 2-D transform data element. Multiplier 205 and 204 are also selected so as to properly process row transform data words containing the number of bits as provided by row transform section 20. Also, registers 101 and 102 are selected to accommodate words of the length provided by adders 104, and the storage locations of registers 201 and 202 are selected to accommodate words produced by adders 204. Adders 104 and 204 are, of course, selected to accommodate data words of the length provided by multipliers 105 and 204, respectively. In a preferred embodiment of device 10, all of the components are arranged to process data in a bit-parallel, word-serial format. However, TMACs 14 could be arranged to process bit-serial input data.

As will be well understood by those skilled in the art, coefficient matrices C and D, respectively stored in ROMs 13 and 15, may be selected so that device 10 performs the 2-D discrete cosine transform (DCT), the inverse of the 2-D DCT, or another desired transform.

It should also be noted that row transform section 20 performs parallel multiplication and accumulation, so that the row transform elements $a_{ij}$ of row i are all calculated in parallel. Further, as noted before, column transform section 30 performs column transforms for all eight columns in parallel. The parallel calculations performed by both sections 20 and 30, and the overlapping in time of operations of sections 20 and 30, contribute to the efficiency of 2-D transform device 10.

Although the embodiments disclosed herein all perform 1-D row transforms and then parallel, column-wise 1-D transforms on the row transform data, those skilled in the art will readily recognize that 1-D column transforms may be performed first, to be followed by parallel, row-wise 1-D transforms, so that 2-D transform data is produced. It is well within the ability of those skilled in the art to adapt the embodiments disclosed herein to perform column transforms followed by row transforms. In fact, in any matrix the designation of one dimension as "rows" and the other as "columns" is arbitrary, and in any description of the embodiments herein, "row" and "column" can be readily interchanged.

Finally, it is to be noted that sections 20 and 30 each contain multiple identical TMAC stages. The repetitive structure of the sections aids in the layout and construction of the device in its preferred form, namely, as a VLSI integrated circuit device.

APPLICATIONS OF 2-D TRANSFORM DEVICE

Figure 8A:
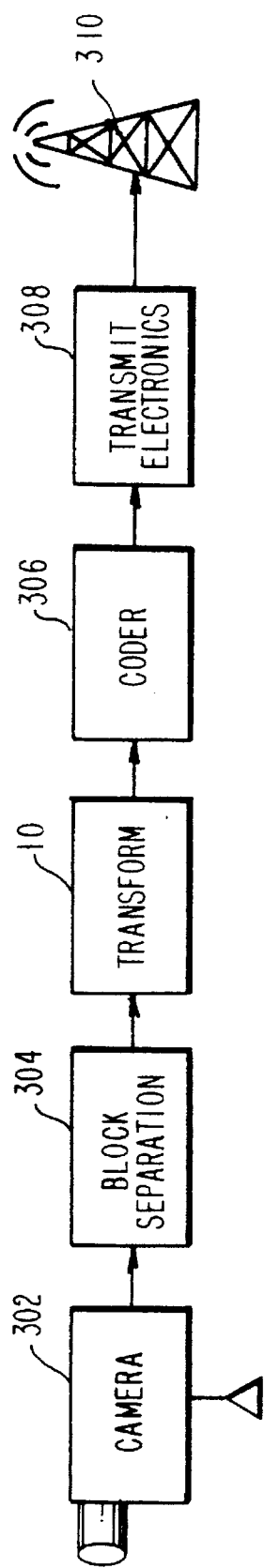
Figure 8B:
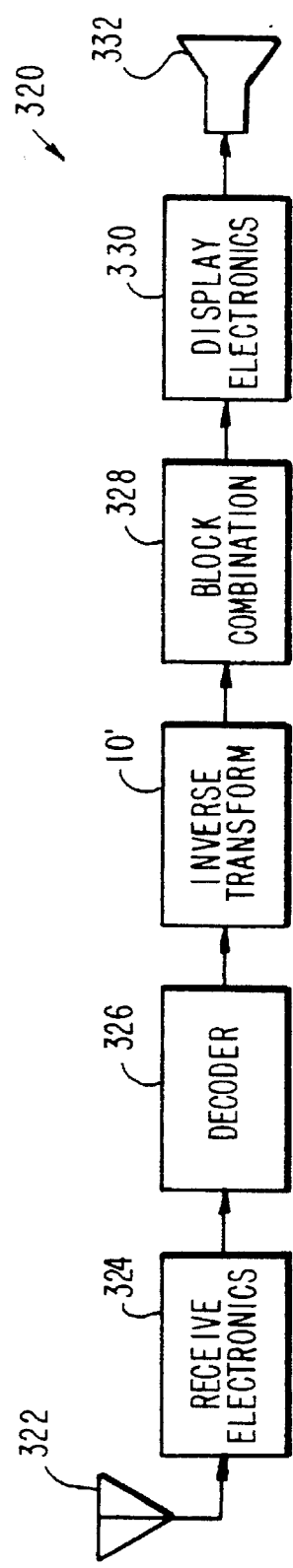

FIGS. 8A and 8B illustrate an application of a transform device 10 according to the present invention in a broadcast television system. Referring first to FIG. 8A, a digital television camera 302 provides digital video image data to block separation module 304. Module 304 separates the video image data into blocks of input data for 2-D transform device 10. Device 10 transforms the input data blocks into transform data blocks, in accordance with the invention as described above. Coefficient matrices C and D stored in device 10 are selected so that a two-dimensional DCT or other desired transform is performed. Then the transform data blocks are supplied to coder 306 for coding in accordance to one or more data encoding and compression schemes. The coded data are then supplied to transmit electronics module 308, which drives broadcast transmitting antenna 310 to broadcast the coded data.

FIG. 8B shows a television receiver, generally indicated by reference numeral 320, for receiving the broadcast signals transmitted by antenna 310 and displaying corresponding television images.

Receiver 320 includes a receiving antenna 322 from which received signals are provided to receive electronics module 324. After processing of the signals by module 324, the processed signals are decoded in decoder 326 and then provided in blocks to 2-D transform device 10'. In terms of its hardware device 10' of receiver 320 may be the same as device 10 shown in FIG. 8A. By storage of appropriate coefficient matrixes C' and D' respectively in ROMs 13 and 15 of device 10' of receiver 320, the transform performed in the transmission system of FIG. 8A may be reversed, thereby providing picture element data to block 328 for combination into screens of video image data. The screens of video image data are then provided to display electronics module 330 which controls display of a corresponding picture on picture tube 332.

The block transform and compression coding performed by module 304, transform device 10 and coder 306 are particularly useful in a high definition (HDTV) broadcast application because there is a great need in such systems to compress the large quantities of picture data provided in HDTV images down to quantities that can be carried by conventional broadcast channels. It should also be understood that compression coding using transform device 10 can also be used with conventional television or other image data transmission systems when it is desired to reduce the amount of image data to be transmitted. When used in a conventional television broadcast system, module 304, device 10 and coder 306 may, for example, code the input data in accordance with the well known MPEG video compression standard. When used in an HDTV application, one or more of the HDTV compression standards would be supported. It should be noted that another source of video image data, such as a video tape recorder, a video image disk player, or a telecine, may take the place of camera 302 in the transmission system of FIG. 8A.

Figure 8C:
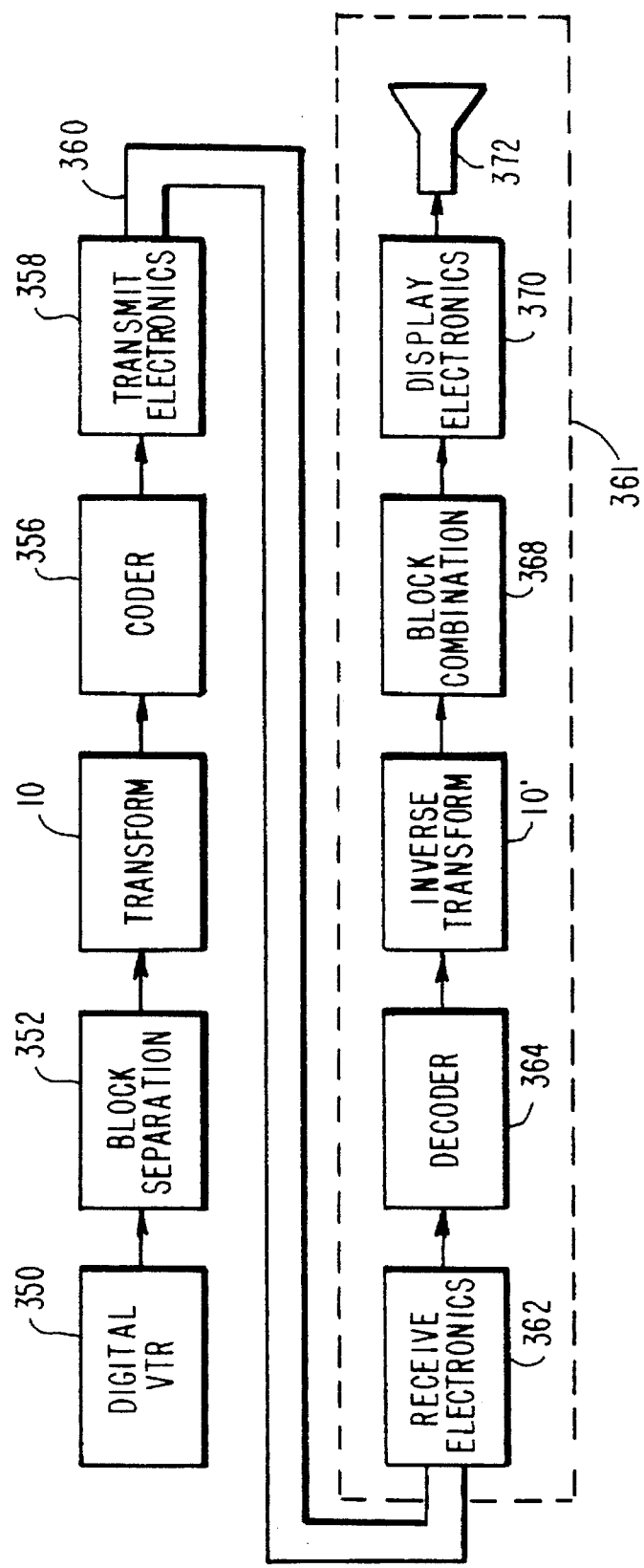

FIG. 8C illustrates application of 2-D transform device 10 to a cable television transmission system.

In the system shown in FIG. 8C, frames of video image data are provided by a digital video tape recorder 350. Block separation module 352 separates the frames of data into input data blocks, which are supplied to 2-D transform device 10, as before. Also as before, the 2-D transform data blocks output by device 10 are coded by coder 356 and provided to transmit electronics 358, which control transmission of the coded data over a cable television distribution network 360. A television receiver 361 is connected to the distribution network 360 and receives the signals transmitted by the distribution system. Television receiver 361 includes a receive electronics module 362 which processes the received signals, and a decoder 364 which decodes the processed signals and provides decoded data blocks to 2-d transform device 10'. As in FIG. 8B, device 10', by storage of appropriate coefficient matrixes C' and D', reverses the transform performed by transform device 10 and provides blocks of picture element data to block combination module 368. Module 368 combines the blocks of data into video image frames and supplies the frames to display electronics module 370 which in controls picture tube 372 to display the corresponding images.

As before, there are other possible sources of video image data. Among these are a digital television camera, a telecine video cassette recorder or a device that reads data from video storage disks.

FIGS. 8D and 8E illustrate an application of device 10 to video image storage.

As shown in FIG. 8D telecine 402 is a source of video image data to be stored in video recording device 404. Video recorder 404 includes block separation module 406, which separates incoming frames of video image data into input data blocks for transform device 10. As before, device 10 performs a 2-D transform on the input data blocks and outputs transform data for coding by coder 408. Coded data from coder 408 is then processed by recording electronics module 410 for recording by record head 412 on a recording medium, which is not shown. The recording medium could be, for example, a magnetic tape (reel to reel or cassette based) or a disk storage medium such as a write once-read-many compact disk. It will be understood that the nature of record head 412 depends on the storage medium to be used.

FIG. 8E illustrates retrieval of video image data using the video recorder 404 of FIG. 8D.

In operation of recorder 404 in a reproduce mode, reproduce head 414 provides video image data reproduced from the recording medium (not shown) for processing by reproducing electronics module 416. The processed data is decoded by decoder 418 and provided as input blocks to transform device 10', which as in previous examples, reverses the 2-D transform that had been performed by device 10 prior to storage of the data on the recording medium. Blocks of pixel data words are then provided from device 10 to block combination module 420 which combines the blocks into screens of video image data. The images are then displayed on a suitable monitor 422, which may be of the type which receives digital video signals.

As discussed with respect to previous applications, other sources of video image data may be substituted for telecine 402. Among these are a digital video camera, a video tape recorder, a video cassette recorder or an optical disk reproducing device.

Figure 8F:
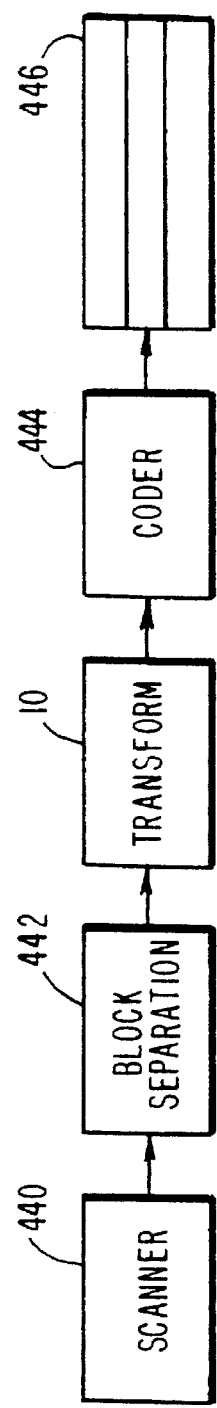

FIG. 8F illustrates application of transform device 10 to image storage in a non-video application.

As shown in FIG. 8F, a scanner 440 provides image data that may be obtained, for example, by scanning a photograph. The image data provided by scanner 440 is separated into blocks of pixel element data by block separation module 442. The data blocks are then transformed by 2-D transform device 10, as before, so that blocks of transform data are provided. The transform data is then coded by coder 444 for storage on a storage medium such as hard disk drive 446. Module 442, device 10 and coder 444 may, for example, implement an image compression standard such as JPEG.

The application illustrated in FIG. 8F could be implemented by having scanner 440, module 442, transform device 10 and coder 44 all integrated in a peripheral device interfaced to a personal computer that includes hard drive 446. Among many other possible implementations, disk drive 446 could be a floppy disk drive, a device for writing information into CD ROMS, bulk tape storage, etc.

As will be appreciated by those skilled in the art, the application of FIG. 8F can be extended to video images by using a telecine, for example, instead of scanner 440 as the source of image data.

In all of the image data storage applications just described, data compression coding, including performance of 2-D transforms by device 10, enables the image data to be stored faster and at a lower cost.

In addition to the image data compression-coding applications described above, the 2-D transform device 10 according to this invention is generally applicable to a wide variety of processes in which a 2-D transform is to be performed. For example, with appropriate selection of coefficient matrixes C and D, device 10 can perform a 2-D discrete Fourier transform (DFT) which can be used in analyzing an image's frequency components and for other purposes.

3-D TRANSFORM DEVICE

Figure 9:
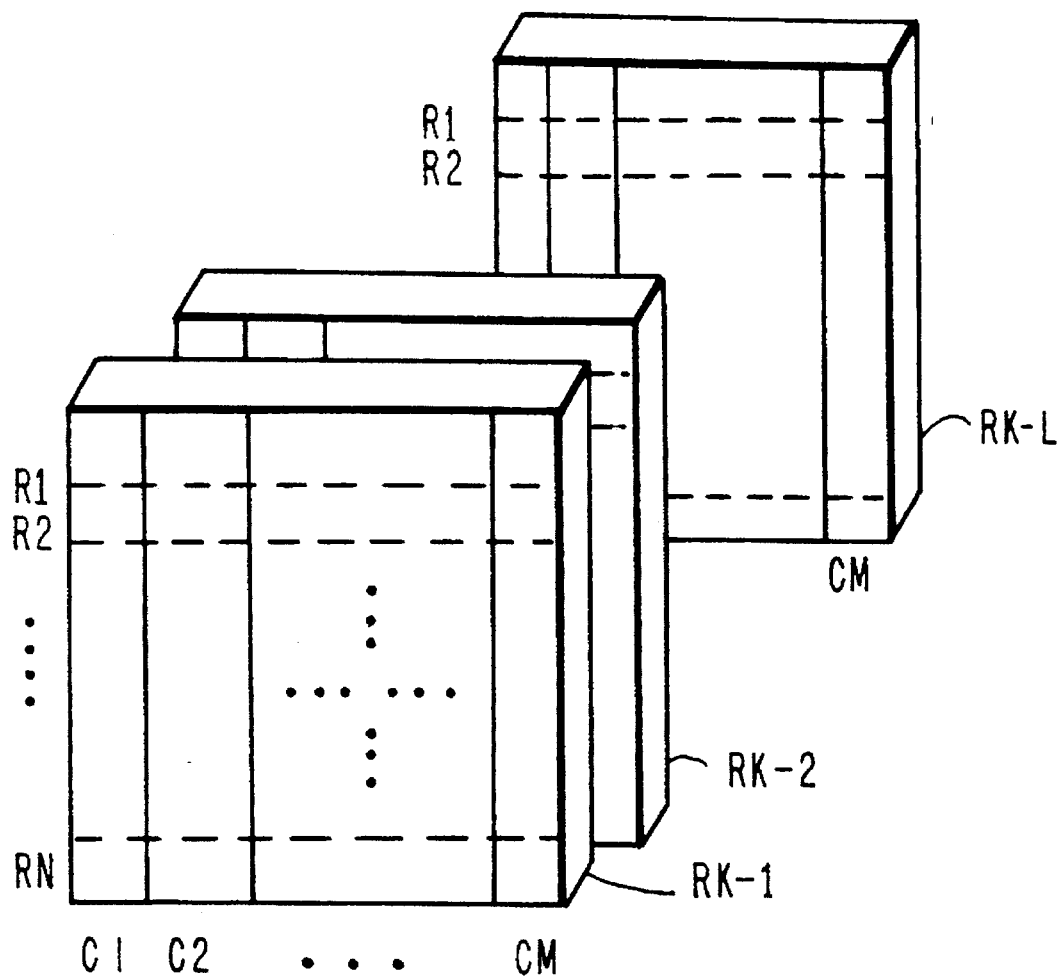
FIG. 9 illustrates in schematic terms a three-dimensional data block.

The N×M data block transform device shown in FIG. 7 may be further generalized to a device that performs a three-dimensional transform on a 3-D data block arrayed in N rows, M columns and L ranks. Such a 3-D data block is schematically shown in FIG. 9. Each of the ranks RK-1, RK-2, . . . , RK-L is a two-dimension N×M data array comprising rows, R1, R2 . . . , RN and columns C1, C2, and . . . , CM.

Figure 10:
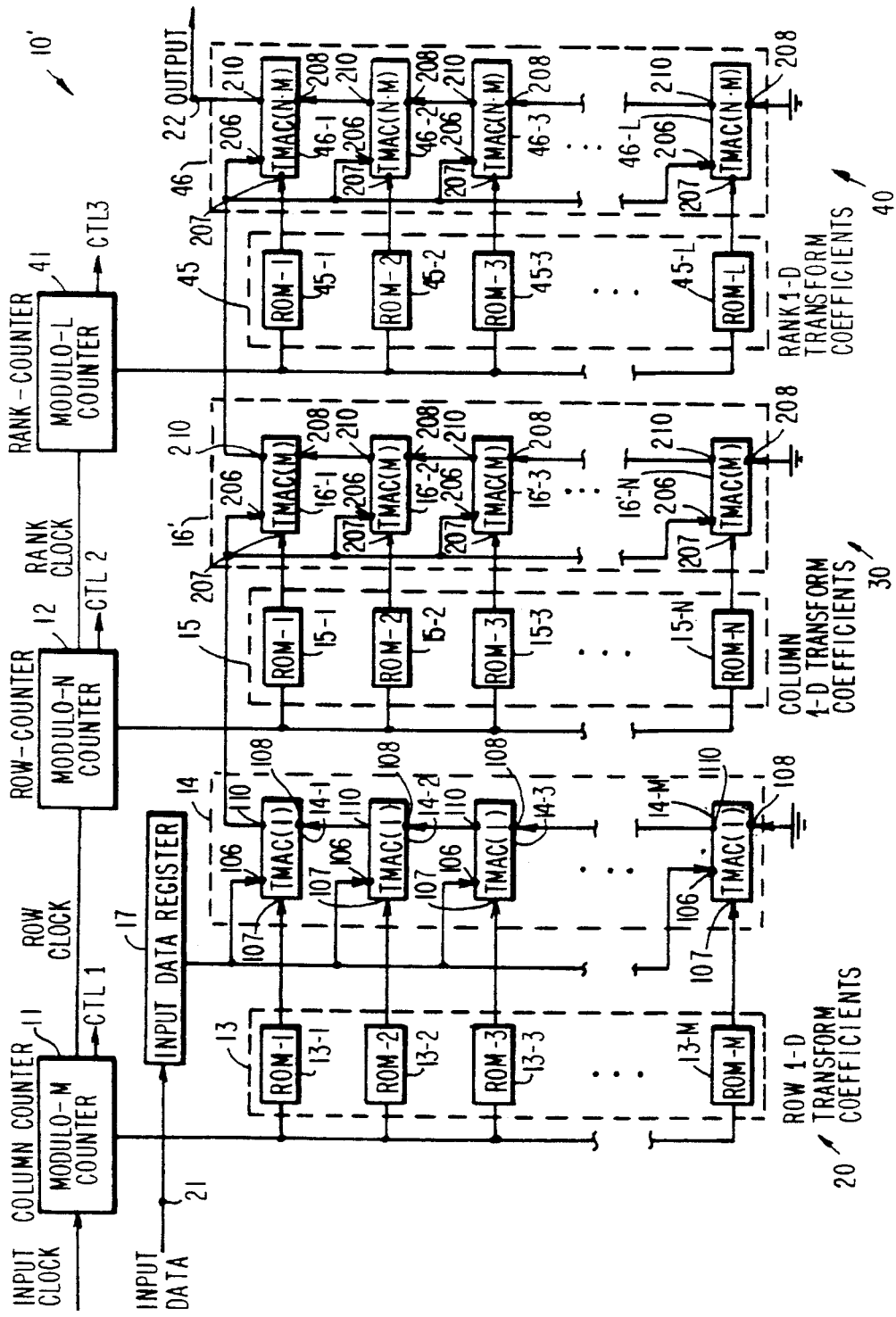
FIG. 10 is a block diagram of a device according to the present invention for performing a 3-D transform on a N row by M column by L rank input data block.

Referring to FIG. 10, reference numeral 10' indicates generally a 3-D transform device. Device 10' includes a row transform section 20 and column transform section 30 like those of device 10 of FIG. 7. In addition device 10' has a rank transform section 40 that is similar to column section 30. Thus rank section 40 includes L ROMs 45, consisting of ROMs 45-1, 45-2, . . . , 45-L, and L TMACs 46, consisting of TMACs 46-1, 46-2, 46-L. ROMs 45 collectively store coefficients $e_i$ making up on L×L coefficient matrix E. TMAC 46-1 is connected to ROM 45-1, TMAC 46-2 is connected to ROM 45-2, and so on through TMAC 46-L which is connected to ROM 45-L.

Rank section 40 includes rank counter 41, which is a modulo-L counter and is connected to row counter 12. Each time row counter 12 "counts over" to "0", it sends a clock pulse to increment rank counter 41. As in sections 20 and 30, rank counter 41 asserts an appropriate address of each ROM 45 so that an appropriate coefficient $e_i$ is provided to each TMAC 46 by its respective ROM 45.

Each TMAC 46 of FIG. 10 has the same structure as TMAC 16-2 of FIG. 5, except that the registers 201, 202 of TMAC 46 (not shown in FIG. 10, but corresponding to registers 201, 202 of FIG. 5) each have N×M data storage locations in a linear array as indicated by the notation "TMAC (N×M)" on FIG. 10. The terminals of TMACs 46 shown in FIG. 10 assigned the same reference numerals as corresponding terminals of TMACs 16 (FIG. 3, 5, 7).

As indicated in FIG. 10, the registers 202 (not shown) of TMACs 46 are chained by their respective input terminals 208 and output terminals 210 in the same manner previously described with respect to the registers 202 of TMACs 16 of section 30. Similarly to section 30, the registers 202 of TMACs 46 operate at appropriate times as a shift register comprising N×M×L locations. Output terminal 210 of TMAC 46-1 is connected to output terminal 22 of device 10'. Input terminal 208 of TMAC 46-L is grounded. Output terminal 210 of TMAC 16-1, instead of being connected to output 22 as in FIG. 3 and 7, is connected in common to the respective input terminal 206 of each TMAC 46, so that 2-D transform data elements serially output by section 30 are successively supplied to TMACs 46 of section 40.

Operation of device 10' is a straightforward generalization of the operation of device 10 (FIGS. 3 and 7) and so will not be described in detail. Referring again to FIG. 10, sections 20 and 30 perform a 2-D transform on each rank of input data elements. Upon completion of the 2-D transform for the rank, the 2-D transform data is shifted out from section 30 to section 40, element-by-element and row-by-row. It will be recognized that the 2-D transform data can also be said to be shifted out to section 40 rank-by-rank. As data from the rank of 2-D transform data is received, section 40 commences N×M parallel, rank-wise one-dimensional transform calculations on the 2-D transform data and continues the calculations as each subsequent rank of 2-D transform data is received. As data elements of the Lth rank of 2-D transform data are received, 3-D transform data elements are stored sequentially in the N×M storage locations of registers 202 of TMACs 46. After the last element of the Lth rank of 2-D transform data is received, section 40 completes the rank-wise one-dimensional transform calculations, so that a N×M×L block of 3-D transform data is collectively stored in the registers 202 of TMACs 46. The 3-D transform data is then shifted out element by element via terminal 22 while the rank-wise 1-D transforms are performed on the next block of 2-D transform data.

It will be apparent that sections 20 and 30 of FIG. 10 constitute a 2-D block data transform device. It is within the contemplation of this invention to provide section 40 as a separate stage that can be coupled to an N×M 2-D transform device 10 (of FIG. 7) to provide a 3-D transform device equivalent to that of FIG. 10.

Figure 11:
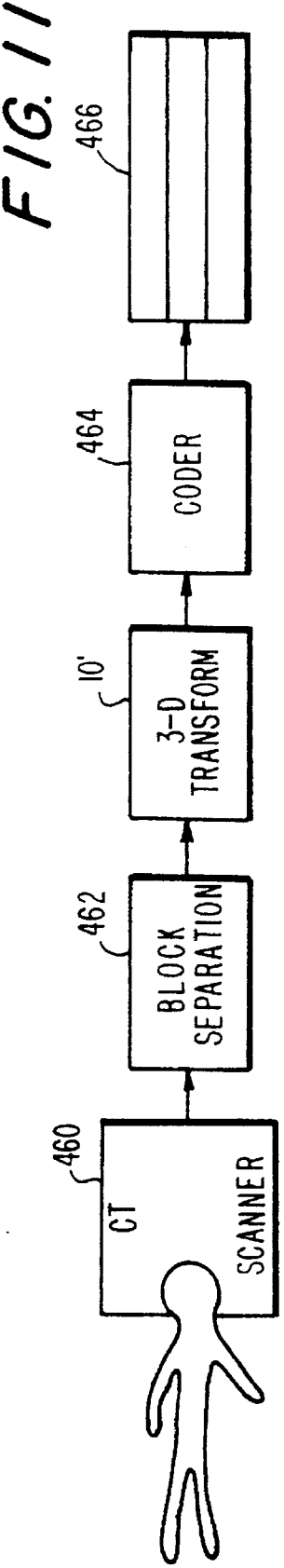
FIG. 11 illustrates an application in which the 3-D transform device of FIG. 10 may be used.

3-D transform device 10' can usefully be applied to a variety of applications, including for example storage of CT scan images, as illustrated in FIG. 11, in which CT scanner 460 provides virtual 3-D image data to block separation module 462. Module 462 separates the image data into N×M×L blocks, which are provided to 3-D transform device 10'. Device 10' performs a 3-D transform on the data blocks and outputs 3-D transform data to coder 464. Coder 464 codes the 3-D transform data for storage in disk storage device 466. The coded data stored in storage device 466 is a compressed form of the data generated by CT scanner 460, so that CT images produced by the CT scanner can be stored more cheaply.

It will be appreciated that a similar system to that shown in FIG. 11 can be employed with other 3-D medical scanning devices such as PET and MRI equipment.

3-D transform device 10' can also be applied to input blocks in which ranks RK-1, RK-2 etc. of FIG. 9 correspond to 2-D images associated with respective points in time. For example, it is known to compression-code video image data by using N-pixel by N-pixel by N-frame data blocks. Input data blocks of this type would also be suitable for processing by device 10'.

The above description of the invention is intended to be illustrative and not limiting. Various changes or modifications in the embodiments described may occur to those skilled in the art and these can be made without departing from the spirit or scope of the invention.

I claim:

1. A device for performing a two-dimensional transform on a block of input data elements arrayed in N rows and M columns, comprising:

row transform means for receiving and sequentially performing a one-dimensional transform on the N rows of said input data to generate N rows of row transform data; and column transform means for receiving said N rows of row transform data row-by-row from said row transform means, performing parallel calculations on said rows of row transform data as said rows of row transform data are received to carry out a one-dimensional transform on said rows of row transform data in a direction orthogonal to said rows, and after receiving the Nth row of said row transform data, completing said calculations to provide an N×M transform data matrix, said column transform means operating to perform said parallel calculations with respect to a first one of said rows of row transform data at the same time that said row transform means is operating to generate a second one of said rows of row transform data from said block of input data elements.

2. The device of claim 1, wherein N=M.

3. The device of claim 2, wherein N=M=8.

4. The device of claim 1, wherein said column transform means comprises an output terminal and means for shifting out said transform data matrix to said output terminal element-by-element.

5. The device of claim 1, wherein said row transform means comprises means for receiving said input data elements element-by-element.

6. The device of claim 1, wherein said row transform means comprises means for shifting out said row transform data to said column transform means element-by-element.

7. The device of claim 1, wherein said row transform means comprises:

M ROMs, each storing M transform coefficients,

M multiplication—accumulator means, each connected to a respective one of said ROMS and each for sequentially receiving selected coefficients read out from its respective ROM, sequentially multiplying input data elements by said coefficients, and accumulating results of said multiplications, and modulo-M counter means connected to said ROMs for selecting said coefficients to be read out from said ROMs.

8. The device of claim 7, wherein said column transform means comprises:

N ROMs, each storing N transform coefficients,

N multiplication—accumulator means, each connected to a respective one of said N ROMs and each for receiving selected coefficients read out from its respective ROM, sequentially multiplying each of the N coefficients by each of M row transform data elements received from said row transform means, and accumulating results of said multiplications in M registers, so that each register contains an accumulation of M respective multiplication results for each of the N coefficients, and modulo-N counter means connected to said N ROMs for receiving clock pulses from said modulo-M counter means and selecting said coefficients to be read out from said N ROMs.

9. The device of claim 8, wherein N=M.

10. The device of claim 9, wherein N=M=8.

11. A method of performing a two-dimensional transform on a block of input data elements arrayed in N rows and M columns, comprising the steps of:

receiving and sequentially performing a one-dimensional transform on the N rows of said input data to generate N rows of row transform data;

receiving said N rows of row transform data row-by-row;

performing parallel calculations on said rows of row transform data as said rows of row transform data are received to carry out a one-dimensional transform on said rows of row transform data in a direction orthogonal to said rows, said parallel calculations being performed with respect to a first one of said rows of row transform data at the same time a second one of said rows of row transform data is being generated from said block of input data elements; and after receiving the Nth row of said row transform data, completing said calculations to provide an N×M transform data matrix.

12. The method of claim 11, wherein N=M and said step of receiving and performing a one-dimensional transform on said input data comprises reading out N coefficients from N ROMs in parallel to N multiplying means and multiplying said read-out coefficients in parallel by an input data element.

13. The method of claim 12, wherein N=M=8.

14. The method of claim 11, further comprising the step of shifting out said transform matrix to an output terminal element-by-element.

15. The method of claim 11, wherein said step of receiving and performing a one-dimensional transform on said input data comprises receiving said input data element-by-element.

16. The method of claim 11, wherein said step of receiving said transform data comprises receiving said transform data element-by-element.

17. In a device for performing a block data transform, a multiplication-accumulator module comprising:

input means for receiving two numbers that are to be multiplied together;

an input terminal for receiving shift data; multiplier means connected to said input means for receiving said two numbers, multiplying said two numbers to form a product and outputting said product;

a first data register for storing accumulation data;

adder means connected to said multiplier means and said first data register for adding said outputted product to said stored accumulation data and for storing a resulting sum as accumulation data in said first register;

a second data register for storing transform data;

multiplexer means connected to said adder means, said second data register and said input terminal, for selectively storing in said second register either shift data received at said input terminal or a sum received from said adder means, and an output terminal for shifting out data stored in said second register.

18. The module of claim 17, wherein said first data register comprises reset means for storing a reset value in said first data register.

19. The module of claim 17, wherein said first data register comprises N data storage locations for storing N respective accumulation data, a first of said locations receiving said sum from said adder means and an Nth of said locations supplying an accumulation data to said adder means, and said second data register comprises N data storage locations for storing N respective shift data, a first of said locations receiving shift data via said multiplexer and an Nth of said locations outputting shift data via said output terminal.

20. The module of claim 19, wherein said first data register further comprises reset means for storing a reset value in said first storage location of said first data register.

21. The module of claim 19, wherein N=8.

22. A method of generating transform data comprising the steps of:

multiplying at least two data words by respective coefficients to form respective products, accumulating said products in a first data register as accumulation data, multiplying a last data word by a last coefficient to form a last product, receiving said accumulation data from said first data register and adding said accumulation data and said last product to form a transform data word, and storing said transform data word in a second data register.

23. The method of claim 22, wherein said second data register is a shift register.

24. The method of claim 23, further comprising the step of shifting said stored transform data word out of said second data register.

25. The method of claim 24, further comprising the step of shifting a second transform data word into said second data register from a third data register.

26. The method of claim 22, further comprising the step of resetting said first data register after said step of adding said accumulation data and said last product.

27. A device for performing a three-dimensional transform on a block of input data elements arrayed in L ranks arranged in N rows and M columns, the device comprising:

2-D transform means for receiving and sequentially performing a two-dimensional transform on each of the L ranks of said input data to generate L ranks of 2-D transform data; and rank transform means for receiving said L ranks of 2-D transform data rank-by-rank from said 2-D transform means, performing parallel calculations on said ranks of 2-D transform data as said ranks of 2-D transform data are received to carry out a one-dimensional transform on said ranks of 2-D transform data in a direction orthogonal to said ranks, and after receiving the Lth rank of said 2-D transform data, completing said calculations to provide an N×M×L transform data matrix.

28. The device of claim 27, wherein said 2-D transform means comprises:

row transform means for receiving said input data rank-by-rank and row-by-row and sequentially performing a one-dimensional transform on the rows of said input data to generate rows of row transform data; and column transform means for receiving said rows of row transform data row-by-row from said row transform means, performing parallel calculations on said rows of row transform data as said rows of row transform data are received to carry out a one-dimensional transform on said rows of row transform data in a direction orthogonal to said rows, and after receiving the Nth row of a rank of said row transform data, completing said column-wise calculations to provide an N×M rank of 2-D transform data.

29. The device of claim 27, wherein said rank transform means comprises an output terminal and means for shifting out said 3-D transform data matrix to said output terminal element-by-element.

30. The device of claim 27, wherein said 2-D transform means comprises means for receiving said input data elements element-by-element.

31. The device of claim 27, wherein said 2-D transform means comprises means for shifting out said 2-D transform data to said rank transform means element-by-element.

32. A method of performing a three-dimensional transform on a block of input data elements arrayed in L ranks arranged in N rows and M columns, comprising the steps of:

receiving and sequentially performing a two-dimensional transform on the L ranks of said input data to generate L ranks of 2-D transform data;

receiving said L ranks of 2-D transform data rank-by-rank;

performing parallel calculations on said ranks of 2-D transform data as said ranks of 2-D transform data are received to carry out a one-dimensional transform on said ranks of 2-D transform data in a direction orthogonal to said ranks; and after receiving the Lth rank of said 2-D transform data, completing said calculations to provide an N×M×L 3-D transform data matrix.

33. The method of claim 32, wherein the step of performing said one-dimensional transform calculations comprises reading out L coefficients from L ROMs in parallel to L multiplying means and multiplying said read-out coefficients in parallel by a 2-D transform data element.

34. The method of claim 32, further comprising the step of shifting out said 3-D transform matrix to an output terminal element-by-element.

35. The method of claim 32, wherein the step of receiving and performing a two-dimensional transform on said input data comprises receiving said input data element-by-element.

36. The method of claim 32, wherein the step of receiving said 2-D transform data comprises receiving said transform data element-by-element.

37. A device for performing a two-dimensional transform on a block of input data elements arrayed in N rows and M columns, comprising:

column transform means for receiving and sequentially performing a one-dimensional transform on the M columns of said input data to generate M columns of column transform data; and row transform means for receiving said M columns of column transform data column-by-column from said column transform means, performing parallel calculations on said columns of column transform data as said columns of column transform data are received to carry out a one-dimensional transform on said columns of column transform data in a direction orthogonal to said columns, and after receiving the Mth column of said column transform data, completing said calculations to provide an N×M transform data matrix, said row transform means operating to perform said parallel calculations with respect to a first one of said columns of column transform data at the same time said column transform means is operating to generate a second one of said columns of column transform data from said block of input data elements.

38. A method of performing a two-dimensional transform on a block of input data elements arrayed in N rows and M columns, comprising the steps of:

receiving and sequentially performing a one-dimensional transform on the M columns of said input data to generate M columns of column transform data;

receiving said M columns of column transform data column-by-column;

performing parallel calculations on said columns of column transform data as said columns of column transform data are received to carry out a one-dimensional transform on said columns of column transform data in a direction orthogonal to said columns, said parallel calculations being performed with respect to a first one of said columns of column transform data at the same time a second one of said columns of column transform data is being generated from said block of input data elements; and after receiving the Mth column of said column transform data, completing said calculations to provide an N×M transform data matrix.

* * * * *